United States Patent
Jia et al.

(10) Patent No.: US 12,292,766 B2
(45) Date of Patent: May 6, 2025

(54) DISPLAY MODULE AND DISPLAY DEVICE

(71) Applicant: WUHAN CHINA STAR OPTOELECTRONICS SEMICONDUCTOR DISPLAY TECHNOLOGY CO., LTD., Hubei (CN)

(72) Inventors: Yongzhen Jia, Hubei (CN); Junqiang Pei, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 18/003,418

(22) PCT Filed: Aug. 30, 2022

(86) PCT No.: PCT/CN2022/115978
§ 371 (c)(1),
(2) Date: Dec. 27, 2022

(87) PCT Pub. No.: WO2024/016431
PCT Pub. Date: Jan. 25, 2024

(65) Prior Publication Data
US 2024/0302866 A1     Sep. 12, 2024

(30) Foreign Application Priority Data
Jul. 19, 2022   (CN) .......................... 202210850437.9

(51) Int. Cl.
*G06F 1/16* (2006.01)

(52) U.S. Cl.
CPC .......... *G06F 1/1656* (2013.01); *G06F 1/1616* (2013.01); *G06F 1/1652* (2013.01)

(58) Field of Classification Search
CPC ..... G06F 1/1656; G06F 1/1616; G06F 1/1652
See application file for complete search history.

(56) References Cited

U.S. PATENT DOCUMENTS 9,379,355 B1 *   6/2016   Lee ........................... B32B 5/18
9,933,870 B2 *   4/2018   You ................... G02F 1/133305
(Continued)

FOREIGN PATENT DOCUMENTS

| CN | 111106150 A | 5/2020 |
| CN | 111710246 A | 9/2020 |

(Continued)

OTHER PUBLICATIONS

International Search Report in International application No. PCT/CN2022/115978, mailed on Nov. 25, 2022.

(Continued)

*Primary Examiner* — Rockshana D Chowdhury
(74) *Attorney, Agent, or Firm* — PV IP PC; Wei Te Chung; Christopher S Ruprecht

(57) ABSTRACT

A display module and a display device are provided. A curved display area of the display module includes a corner area and an edge area. The display module includes display panel and a supporting component. The display panel includes a display function part and a bonding part. The supporting part includes a first backplate and a second backplate. The first backplate includes a first unit disposed in the corner area. A thickness of the first unit is greater than a thickness of the second backplate.

20 Claims, 12 Drawing Sheets

(56) References Cited

U.S. PATENT DOCUMENTS

| | | | | |
|---|---|---|---|---|
| 12,068,331 | B2* | 8/2024 | Chang | H01L 23/4985 |
| 2014/0217382 | A1* | 8/2014 | Kwon | H10K 50/8426 |
| | | | | 257/40 |
| 2015/0108439 | A1 | 4/2015 | Kim et al. | |
| 2016/0183399 | A1 | 6/2016 | Lee et al. | |
| 2018/0081399 | A1* | 3/2018 | Kwon | G09G 5/00 |
| 2020/0035776 | A1* | 1/2020 | Kim | H01L 27/1218 |
| 2021/0127517 | A1 | 4/2021 | Kim et al. | |
| 2022/0157916 | A1* | 5/2022 | Kwon | H10K 71/00 |
| 2022/0181576 | A1* | 6/2022 | Cha | H05K 1/028 |
| 2022/0209167 | A1* | 6/2022 | Park | B32B 5/18 |
| 2024/0099083 | A1* | 3/2024 | Yang | H10K 59/90 |

FOREIGN PATENT DOCUMENTS

| | | |
|---|---|---|
| CN | 112071884 A | 12/2020 |
| CN | 112086570 A | 12/2020 |
| CN | 112445275 A | 3/2021 |
| CN | 112599018 A | 4/2021 |
| CN | 112700717 A | 4/2021 |
| CN | 213183388 U | 5/2021 |
| CN | 113433731 A | 9/2021 |
| CN | 113707031 A | 11/2021 |
| CN | 113744632 A | 12/2021 |
| CN | 114550589 A | 5/2022 |

OTHER PUBLICATIONS

Written Opinion of the International Search Authority in International application No. PCT/CN2022/115978, mailed on Nov. 25, 2022.
Chinese Office Action issued in corresponding Chinese Patent Application No. 202210850437.9 dated Nov. 28, 2023, pp. 1-7.
Chinese Office Action issued in corresponding Chinese Patent Application No. 202210850437.9 dated Apr. 20, 2023, pp. 1-8.

\* cited by examiner

DISPLAY MODULE AND DISPLAY DEVICE

FIELD

The present disclosure relates to a field of display, and more particularly, to a display module and a display device.

BACKGROUND

In recent years, a curved edge design of display modules is a common way to improve visual experiences and realize full-screen panels. To further optimize visual experiences, four corners of display screens are also designed to be curved. In organic light-emitting diode (OLED) display modules, four corners have gaussian surfaces. When display panels are attached to a spherical surface, stress, caused by compression of material, generated at corners where long edges and short edges are connected cannot be released because the display panels have poor flexibility and have a stacked structure with a continuous surface. Stress concentration leads to warping and a fold of display panels, which damages an encapsulation structure of a display module, results in a dark spot appearing on the display panels, and affects a display effect.

Therefore, is it urgent to provide a display module and a display device to solve the above technical issues.

SUMMARY

The present disclosure provides a display module and a display device, which can alleviate technical issues of warping easily occurring on a corner area of conventional curved display modules.

To solve the above technical issues, technical solutions provided by the present disclosure area described as follows.

An embodiment of the present disclosure provides a display module, comprising a display area, wherein the display area comprises a flat display area and a curved display area surrounding the flat display area, the curved display area comprises four corner areas and an edge area defined between two adjacent corner areas, and the display module comprises:
- a display panel, wherein the display panel comprises a display function part disposed in the display area, a bonding part opposite to the display function part, and a bending part connecting the display function part with the bonding part; and
- a supporting component, wherein the supporting component is disposed on a side of the display panel, the supporting component comprises a first backplate and a second backplate opposite to each other, the first backplate is disposed on a side of the display panel close to the bonding part, and the second backplate is disposed on a side of the bonding part close to the display function part;
- wherein the first backplate comprises a first unit disposed in the corner areas, and a thickness of the first unit is greater than a thickness of the second backplate.

Preferably, the thickness of the first unit is greater than or equal to 90 μm.

Preferably, the first backplate comprises a second unit disposed in the edge area, the first unit is connected to the second unit, and a thickness of the second unit is equal to the thickness of the first unit.

Preferably, the first backplate comprises a third unit disposed in the edge area, the third unit is connected to the first unit and the second unit; and wherein a thickness of the third unit is equal to the thickness of the first unit.

Preferably, in at least one of the corner areas, the thickness of the first unit is increasingly increased along a direction away from the flat display area, and a minimum thickness of the first unit is greater than the thickness of the second backplate.

Preferably, the first backplate comprises a second unit disposed in the edge area, the first unit is connected to the second unit, the thickness of the first unit is greater than a thickness of the second unit, and the thickness of the second unit is greater than thickness of the second backplate.

Preferably, the first backplate comprises a third unit disposed in the flat display area, the third unit is connected to the first unit and the second unit; and wherein a thickness of the third unit is less than a thickness of the second unit, and the thickness of the third unit is greater than the thickness of the second backplate.

Preferably, at least one of the corner areas, the thickness of the first unit is increasingly increased along a direction away from the flat display area, and a minimum thickness of the first unit is greater than the thickness of the second backplate.

Preferably, the first unit comprises a first surface defined on a first side of the first backplate and a second surface defined on a second side of the first backplate, and the second unit comprises a third surface defined on the first side of the first backplate and a fourth surface defined on the second side of the second backplate; and wherein the first surface is flush with the third surface, a minimum distance between the first surface and the second surface is greater than or equal to a maximum distance between the third surface and the fourth surface, and the second surface is an arc surface.

Preferably, the first backplate comprises a second unit disposed in the edge area, the first unit is connected to the second unit, and an elastic modulus of the first unit is less than an elastic modulus of the second unit.

Preferably, the thickness of the first unit is less than or equal to 250 μm.

Preferably, the thickness of the first unit is less than or equal to 150 μm.

An embodiment of the present disclosure further provides a display device, comprising a display module and a main body device, wherein the main body device and the display module are integrated:
- wherein the display area comprises a flat display area and a curved display area surrounding the flat display area, the curved display area comprises four corner areas and an edge area defined between two adjacent corner areas, and the display module comprises:
- a display panel, wherein the display panel comprises a display function part disposed in the display area, a bonding part opposite to the display function part, and a bending part connecting the display function part with the bonding part; and
- a supporting component, wherein the supporting component is disposed on a side of the display panel, the supporting component comprises a first backplate and a second backplate opposite to each other, the first backplate is disposed on a side of the display panel close to the bonding part, and the second backplate is disposed on a side of the bonding part close to the display function part;
- wherein the first backplate comprises a first unit disposed in the corner areas, and a thickness of the first unit is greater than a thickness of the second backplate.

Preferably, the thickness of the first unit is greater than or equal to 90 μm.

Preferably, the first backplate comprises a second unit disposed in the edge area, the first unit is connected to the second unit, and a thickness of the second unit is equal to the thickness of the first unit.

Preferably, in at least one of the corner areas, the thickness of the first unit is increasingly increased along a direction away from the flat display area, and a minimum thickness of the first unit is greater than the thickness of the second backplate.

Preferably, the first backplate comprises a third unit disposed in the flat display area, the third unit is connected to the first unit and the second unit; and wherein a thickness of the third unit is less than the thickness of the second unit, and the thickness of the third unit is greater than the thickness of the second backplate.

Preferably, the first backplate comprises a second unit disposed in the edge area, the first unit is connected to the second unit, the thickness of the first unit is greater than a thickness of the second unit, and the thickness of the second unit is greater than thickness of the second backplate.

Preferably, in at least one of the corner areas, the thickness of the first unit is increasingly increased along a direction away from the flat display area, and a minimum thickness of the first unit is greater than the thickness of the second backplate.

Preferably, the first backplate comprises a second unit disposed in the edge area, the first unit is connected to the second unit, and an elastic modulus of the first unit is less than an elastic modulus of the second unit.

Regarding the Beneficial Effects:

in the present disclosure, a thickness of a supporting component disposed at a corner area is increased, thereby increasing a stress threshold value of warping generation. As such, an occurrence possibility of warping and warping amplitude are reduced, effects of warping on a normal display are weakened, and a display effect of the display module is improved.

DETAILED DESCRIPTION

Figure 1:
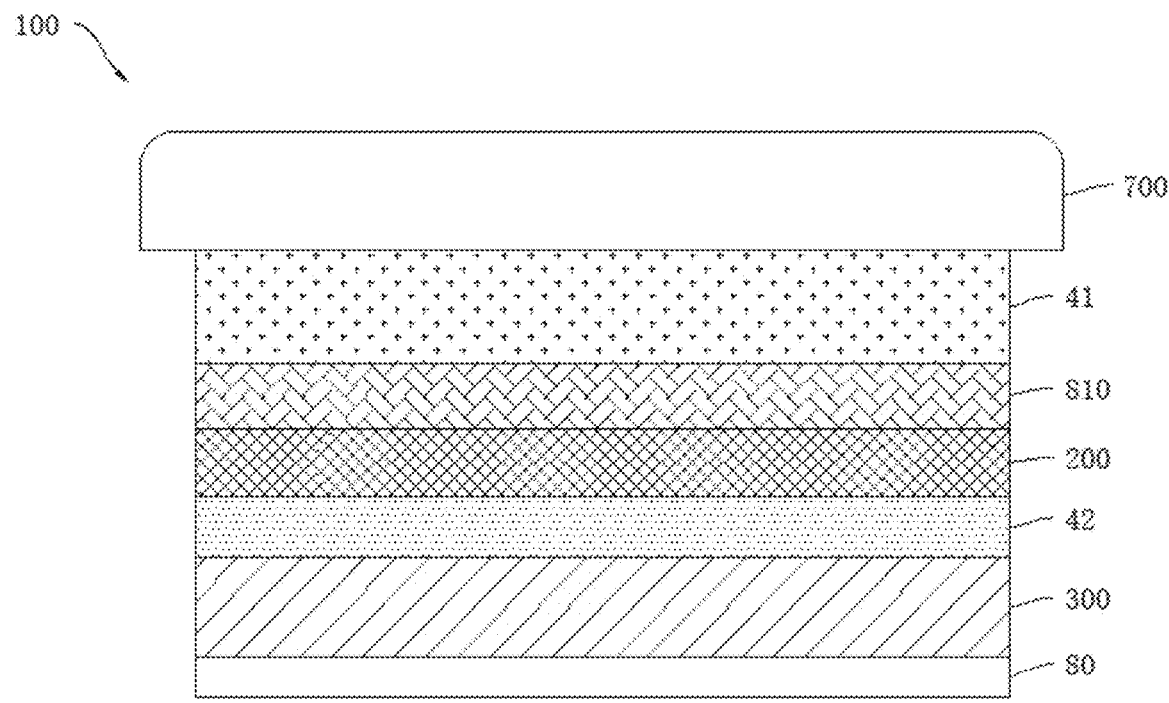
FIG. 1 is a structural schematic view showing a display module provided by an embodiment of the present disclosure.
Figure 2:
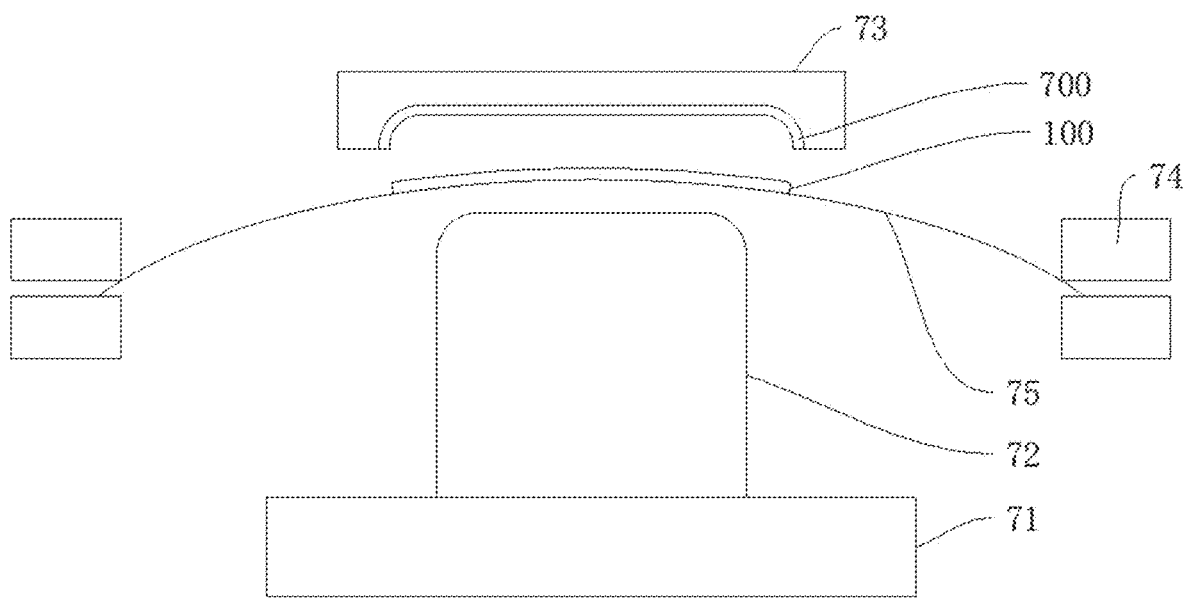
FIG. 2 is a structural schematic view showing manufacturing processes of curving the display module provided by the embodiment of the present disclosure.

The present disclosure provides a display module and a display device. Embodiments are further described below in detail with reference to accompanying drawings to make objectives, technical solutions, and effects of the present disclosure clearer and more precise. It should be understood that described embodiments are merely used to construct the present disclosure and are not intended to limit the present disclosure.

Embodiments of the present disclosure provides a display module and a display device which are described below respectively in details. It should be noted that a following description order of the embodiments does not intend to limit a preferred order of the embodiments.

Please refer to FIGS. 1 to 22. An embodiment of the present disclosure provides a display module 100, including a display area 101. The display area 101 includes a flat display area 102 and a curved display area 103 surrounding the flat display area 102. The curved display area 103 includes four corner areas 104 and an edge area 105 defined between two adjacent corner areas 104. The display module 100 includes:

a display panel 200, including a display function part 210 disposed in the display area 101, a bonding area 230 opposite to the display function part 210, and a bending part 220 connecting the display function part 210 with the bonding part 230;

a supporting component 300 disposed on a side of the display panel 200, wherein the supporting component 300 includes a first backplate 310 and a second backplate 320 opposite to each other, the first backplate 310 is disposed on a side of the display function part 210 close to the bonding area 230, and the second backplate 320 is disposed on a side of the bonding part 230 close to the display function part 210.

The first backplate 310 includes a first unit 311 disposed in the corner areas 104. A thickness of the first unit 311 is greater than a thickness of the second backplate 320.

When display panels are attached to a polarizer layer and a cover plate, main layers to counteract generation of warping due to the attachment are a supporting component and the polarizer layer. A thickness of the supporting component is easy to be controlled. In the present disclosure, a thickness of the supporting component in corner areas are increased, thereby increasing a stress threshold value of warping generation. As such, an occurrence possibility of warping and warping amplitude are reduced, effects of warping on a normal display are weakened, and a display effect of the display module is improved.

Technical solutions of the present disclosure are described below in conjunction with specific embodiments.

In the present embodiment, as shown in FIG. 1, FIG. 3, FIG. 4, and FIG. 7, the display module 100 includes the display area 101. The display area 101 includes the flat display area 102 and a curved display area 103 surrounding the flat display area 102. The flat display area 103 includes four corner areas 104 and a border area 105 disposed between two adjacent corner areas 104. The display module 100 includes the display panel 200 and the supporting component 300 disposed on a side of the display panel 200. The display panel 200 includes the display function part 210 disposed in the display area 101, a bonding area 230 opposite to the display function part 210, and a connecting part connecting the display function part 210 with the bonding part 230. The supporting component 300 includes the first backplate 310 and the second backplate 320 opposite to each other. The first backplate 310 is disposed on a side of the display function part 210 close to the bonding part 230. The second backplate 320 is disposed on a side of the bonding part 230 close to the display function part 210. The first backplate 310 includes a first unit 311 disposed in the corner areas 104. A thickness of the first unit 311 is greater than a thickness of the second backplate 320.

Figure 5:
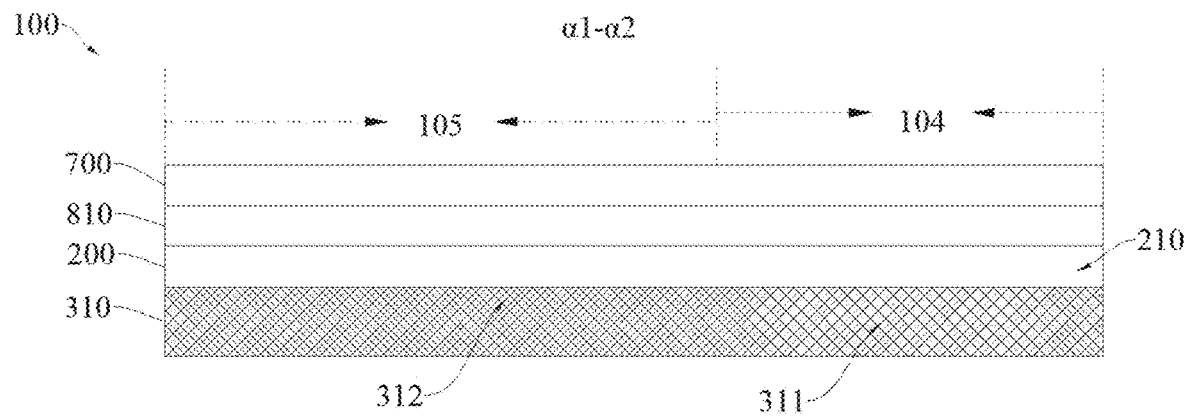
FIG. 5 is a first structural schematic view taken along cross-section a1-a2 in FIG. 3.
Figure 6:
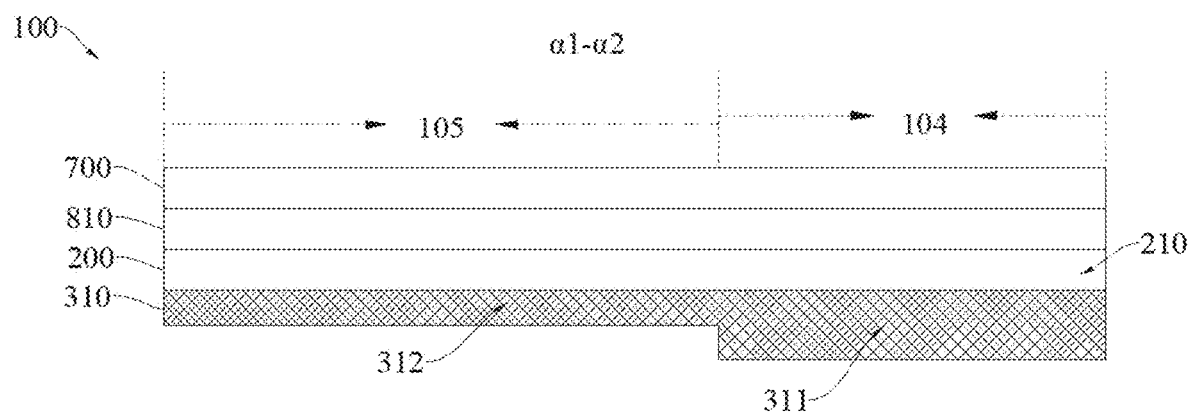
FIG. 6 is a second structural schematic view taken along cross-section a1-a2 in FIG. 3.
Figure 7:
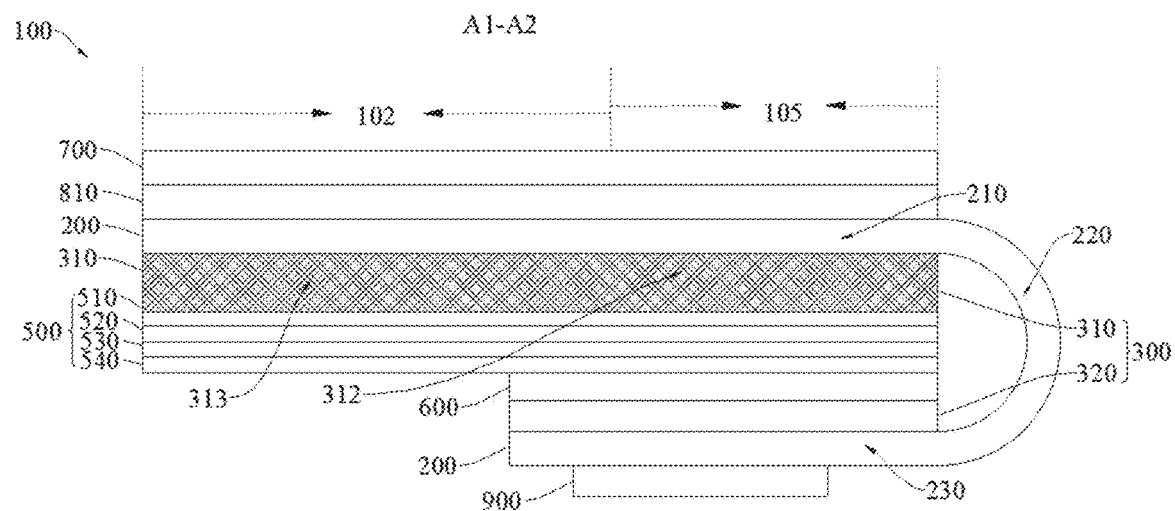
FIG. 7 is a first structural schematic view taken along cross-section A1-A2 in FIG. 3.

The thickness of the first unit 311 is greater than the thickness of the second backplate 320, which can be referred to cross-sections of FIG. 5, FIG. 6, and FIG. 7. This is easy to be understood but is hard to be drawn.

Please refer to FIG. 1 again. In some embodiments, the display module 100 includes the display panel 200, the supporting component 300, a polarizer layer 810, and a cover plate 700. The first backplate 310 of the supporting component 300 is attached to a side of the display panel 200 by a first adhesive layer 42. The polarizer 810 is disposed on a side of the display panel 200 away from the first backplate 310, and the cover plate 700 is attached to a side of the polarizer 810 away from the display panel 200.

It should be understood that the polarizer 810 is disposed on a light-emitting side of the display panel 200 to reduce reflected light and improve a display effect. The supporting component 300 is disposed on a side of the display panel 200 away from the light-emitting side to support and protect the display panel 200.

It should be noted that, in the present embodiment, the display panel may be a four-curved-surface display panel. That is, a number of the edge area 105 defined at lateral edges is four, and the corner areas 104 is formed between any two adjacent edge areas 105. Furthermore, the display module is disposed in the curved display area 103, and is bent toward a side away from the light-emitting side, thereby forming the four-curved-surface display panel. In embodiments of the present disclosure, the above number of the curved surfaces and the above bending direction are taken as examples to describe the present disclosure. However, the number of the curved surfaces and the bending direction are not limited thereto.

It has been verified that warping of curved display panels is mainly generated during attachment processes of cover plates. Please refer to FIG. 1 and FIG. 2, which are structural schematic views showing processes of attaching the cover plate 700 to the display module 100 in the present embodiment. When the cover plate 700 is attached, the display module is not completely manufactured yet. Meanwhile, the display module 100 mainly includes the first backplate 310, the first adhesive layer 42, the display panel 200, the polarizer 810, and an adhesive layer 41 which are stacked. The above module structure is attached to the cover plate 700 by an attachment apparatus. The attachment apparatus includes a bottom machine 71, a bending component 72 disposed on the bottom machine 71, an upper machine 73 disposed on the bottom machine 71, a fixing clamping structure 74 disposed between the bottom machine 71 and the upper machine 73, and a supporting substrate 75 fixedly clamped by the fixing clamping structure 74. Specifically, the display module 100 is disposed on the supporting substrate 75. The cover plate 700 is disposed in the upper machine 73. A bending arc of the cover plate 700 matches a bending arc of the upper machine 73, The bottom machine drives the bending component 73 to move upward. Therefore, both the supporting substrate 75 and the display module 100 are bent and are attached to a side of the cover plate 700 close to the display module 100. As such, a gaussian curved surface attachment is formed at corners. After verification, the present embodiment found out warping is easily formed during processes of attaching the cover plate 700 to the display module 100 because an area of a curved surface at corners of the display panel 100 is greater than an area of a curved surface at corners of the cover plate 700.

Therefore, the present embodiment repeatedly verified and analyzed a thickness relationship between layers in display panels with multiple factors many times, and found out increasing a thickness of the first backplate 310 can effectively alleviate warping phenomenon occurring on corners of display panels.

During attachment processes of the display panel 200, the supporting component 300, the polarizer layer 810, and the cover plate 700, a heat-dissipation layer 80 are not disposed on a back surface of the display panel 200. The display panel 200, the supporting component 300, the polarizer layer 810, and adhesive layers corresponding to relevant layers are attached in the processes. A thickness of the display panel 200 and a thickness of the adhesive layers are relatively small. Therefore, effects of warping on attachment processes of the display panel 200 and the adhesive layers are relatively slight. The supporting component 300 and the polarizer 810 have more contribution rates to reduce warping. Because of process difficulties, a thickness of the polarizer layer 180 is difficult to be increased. Therefore, a thickness of the first unit 311 of the supporting component 300 at the corner areas 104 is increased. As such, a supporting effect on the display function part 210 during attachment can be improved, an occurrence possibility of warping is reduced, and a fluctuation degree of warping is reduced.

In some embodiments, in different experimental groups, a thickness of the polarizer layer 810 is constant, a thickness of the first unit 311 is equal to a thickness of the second unit 312, and the thickness of the first unit 311 is constant. Experimental conditions of a first experiment group are: the thickness of the first backplate 310 is 60 μm and a thickness of the polarizer layer 810 is 106 μm. Experimental conditions of a second experiment group are: the thickness of the first backplate 310 is 90 μm and the thickness of the polarizer layer 810 is μm. Experimental conditions of a third experimental group are: the thickness of the first backplate 310 is 150 μm and the thickness of the polarizer layer 810 is 106 μm.

Results of the first experimental group and the second experimental group are shown in a following table 1. Warping may be regarded as a wave shape similar to a sine function. Maximum warping amplitude denotes a maximum distance between a peak and a valley. Maximum warping wavelength denotes a width of a complete wave.

TABLE 1

| Experimental group | Maximum warping amplitude/mm | Maximum warping wavelength/mm |
| --- | --- | --- |
| 1 | 0.074 | 0.872 |
| 2 | 0.064 | 0.837 |

Please refer to FIG. 18, FIG. 19, FIG. 21, and FIG. 22. When the thickness of the first backplate 310 is changed from 60 μm to 90 μm, the maximum warping amplitude is decreased by 13.5%. Compared to the increased thickness, a reduction rate of the maximum warping amplitude reduction is 0.00033 mm/μm, and the maximum warping amplitude is less than 0.07 mm. Therefore, a warping amplitude improvement effect is good. Furthermore, a shortening ratio of the maximum warping wavelength is 4.01%. A longer the maximum warping wavelength, a longer a warping undulation period, a less a shortening ratio of the maximum warping wavelength, and a smaller a warping density per unit bonding area. When the display panel 200 is attached to the polarizer layer 810 and the cover plate 700, a higher a contact degree between two attachment surfaces, a better an attachment effect. When the thickness of the first backplate 310 is 90 μm, the maximum warping amplitude is significantly reduced, and a reduction degree of the maximum warping wavelength is relatively low. The maximum warping wavelength is still at a level of 0.8 mm. As such, it is necessary to make the thickness of the first backplate 310 greater than or equal to 90 μm, which can effectively reduce an occurrence probability of warping, reduce warping amplitude, and weaken effects of warping on a normal display. Therefore, a display effect of the display module 100 is improved.

The supporting component 300 is disposed on a side of the display panel 200 away from the light-emitting side. By increasing the thickness of the first unit 311 to 90 μm, support performance of the first unit 311 to the display panel 200 is improved when the display function part 210 is attached to the cover plate 700. A stress threshold value of warping generation is also increased. Therefore, an occurrence possibility of warping and warping amplitude can be reduced, effect of warping on a normal display can be weakened, and a display effect of the display module 100 can be improved.

Figure 3:
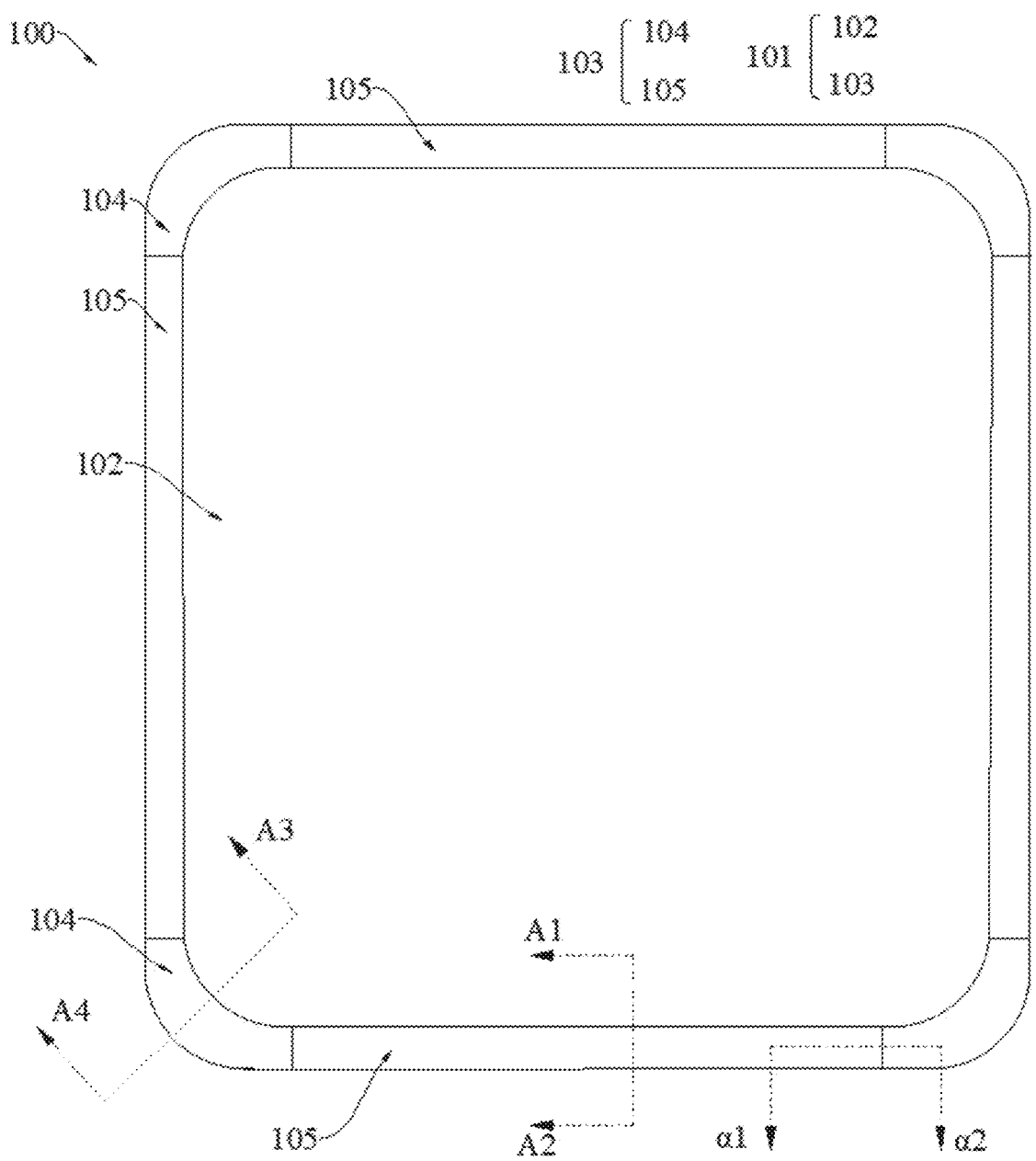
FIG. 3 is a schematic top view showing the display module provided by the embodiment of the present disclosure.
Figure 4:
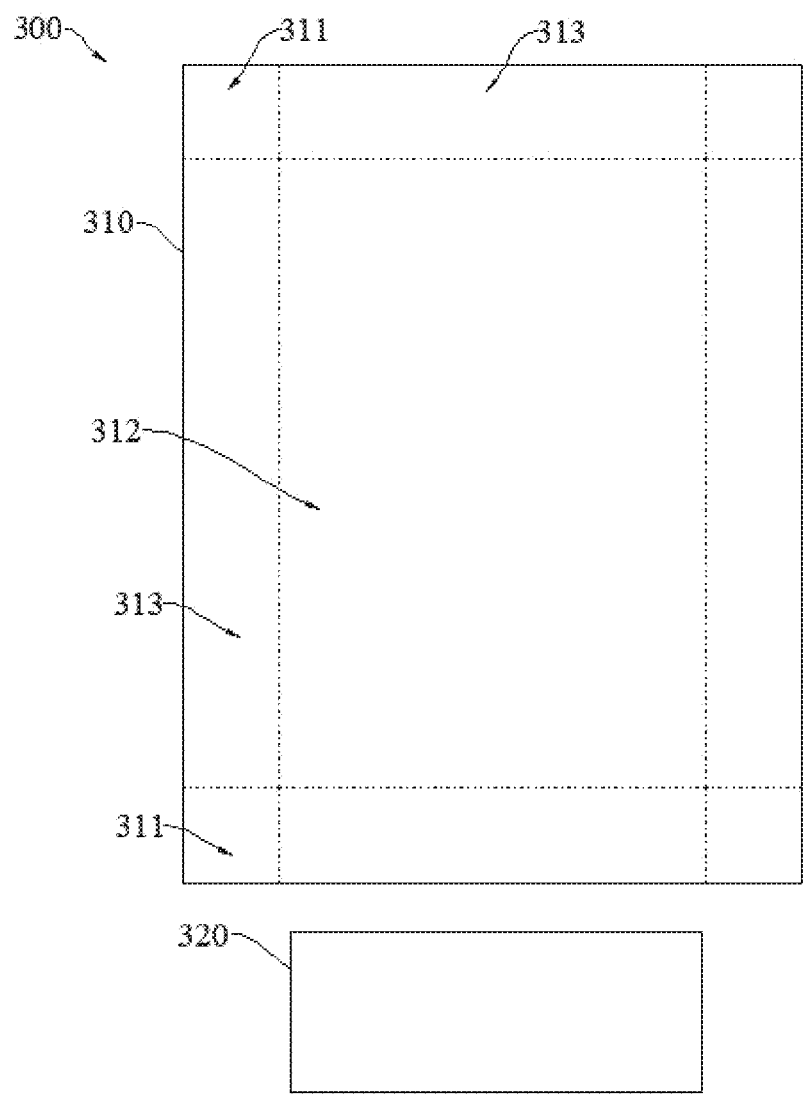
FIG. 4 is a schematic top view showing an unfolded supporting component of the display module provided by the embodiment of the present disclosure.

In some embodiments, as shown in FIG. 3, FIG. 4, and FIG. 5, the first backplate 310 further includes a second unit 312 disposed in the edge area 105. The first unit 311 and the second unit 312 are connected to each other. A thickness of the second unit 312 is equal to the thickness of the first unit 311.

It is easy to understand that the thickness of the first unit 311 is equal to the thickness of the second unit 312, and therefore no cross-sectional view thereof is shown. Layers in the edge area 105 of the first backplate 310 and layers in the corner areas 104 of the first backplate 310 are same. As such, imported material can be easy to be patterned, and cost of the imported material can be reduced.

In some embodiments, as shown in FIG. 3, FIG. 4, FIG. 6, FIG. 7, FIG. 8, and FIG. 9, the first backplate 310 further includes the second unit 312 located disposed the edge area 105. The unit 311 and the second unit 312 are connected to each other. The thickness of the first unit 311 is greater than the thickness of the second unit 312, and the thickness of the second unit 312 is greater than the thickness of the second backplate 320.

The thickness of the second backplate 320 is relatively thin, which is beneficial for improving bending performance of the second backplate 320. A thickness of a third unit 313 in the edge area 105 is designed to be greater, which can increase a stress threshold value of warping generation in the edge area 105. Therefore, an occurrence possibility of warping and warping amplitude can be reduced, effect of warping on a normal display can be weakened, and a display effect of the display module 100 can be improved.

Furthermore, compared to the second unit 312 without the second unit 312 having an increased thickness, the thickness of the second backplate 320 is reduced, and a total thickness of the second unit 312 and the second backplate 320 remains unchanged. Therefore, a radian of the bending part 220 is same as an originally designed radian. For example, before the second unit 312 is thickened, the thickness of the second unit 312 is 60 μm, and the thickness of the second backplate 320 is 90 μm. After the second unit 312 is thickened, the thickness of the second unit 312 is 90 μm, and the thickness of the second backplate 320 is 60 μm. Alternatively, before the second unit 312 is thickened, the thickness of the second unit 312 is 90 μm, and the thickness of the second backplate 320 is 90 μm. After the second unit 312 is thickened, the thickness of the second unit 312 is 150 μm, and the thickness of the second backplate 320 is 30 μm. Under a condition that a thickness of other layers, such as the polarizer layer 810 or an insulating layer of the display panel 200, remains unchanged, a bending radius of the bending part 220 remains unchanged. Therefore, a radian of the bending part 220 remains unchanged. Stress applied to other layers remains unchanged, and cost of adjusting stress applied to other layers is reduced.

In some embodiments, as shown in FIG. 12, FIG. 13, FIG. 15, FIG. 16, and FIG. 17, in at least one of the corner areas 104, the thickness of the first unit 311 is increasingly increased along a direction away from the flat display area 102. A minimum thickness of the first unit 311 is greater than the thickness of the second backplate 320.

According to experiments, the minimum thickness of the first unit 311 is greater than the thickness of the second backplate 320, and warping generally occurs on an edge of the corner area 104. Therefore, a closer an edge of the corner areas 104 and the first unit 311, a greater the thickness of the first unit 311. This is beneficial for increasing a stress threshold value of warping generation. As such, an occurrence possibility of warping and warping amplitude are reduced, effects of warping on a normal display are weakened, and a display effect of the display module 100 is improved.

Figure 13:
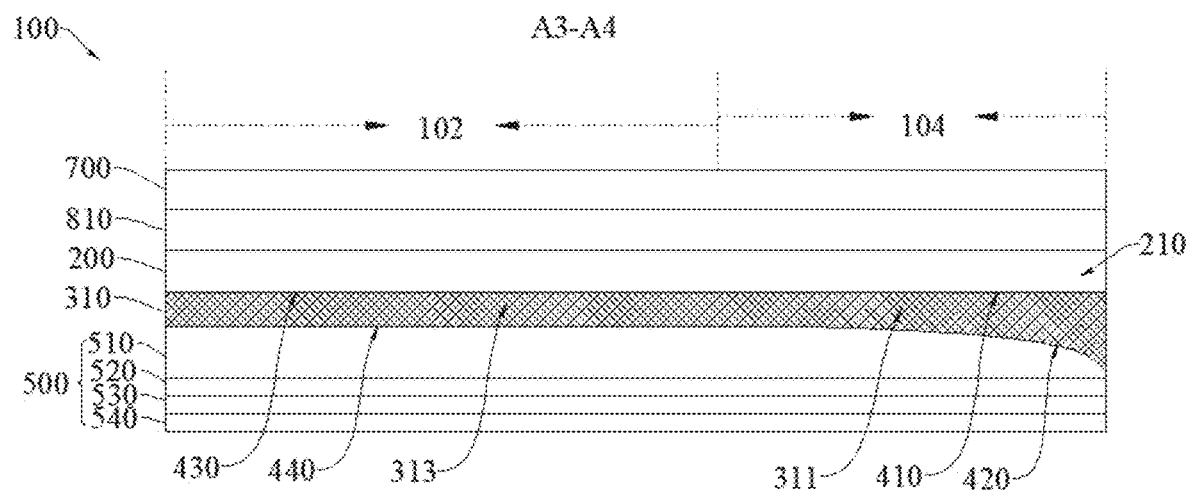
FIG. 13 is a fourth structural schematic view taken along cross-section A3-A4 in FIG. 3.
Figure 16:
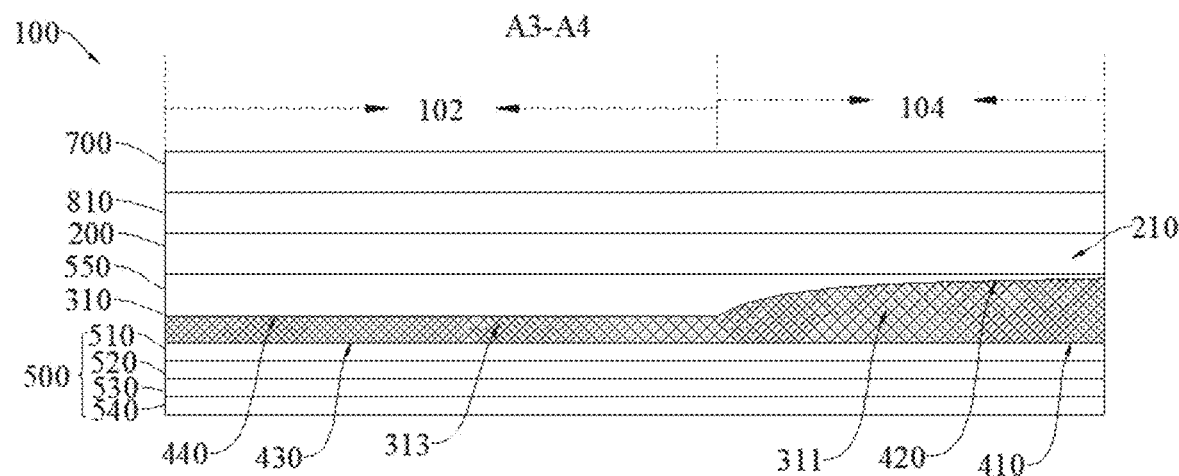
FIG. 16 is a seventh structural schematic view taken along cross-section A3-A4 in FIG. 3.
Figure 17:
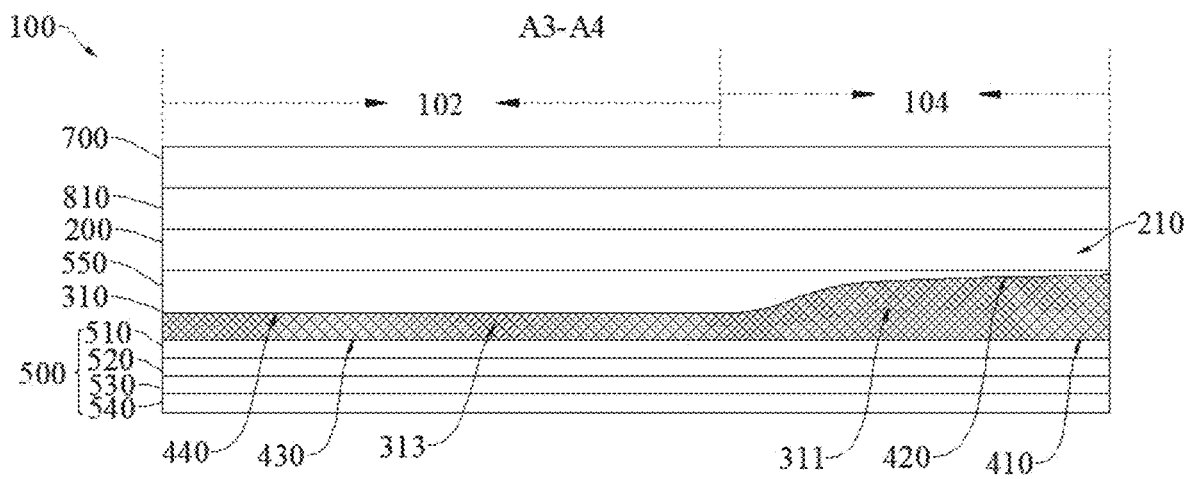
FIG. 17 is an eighth structural schematic view taken along cross-section A3-A4 in FIG. 3.
Figure 18:
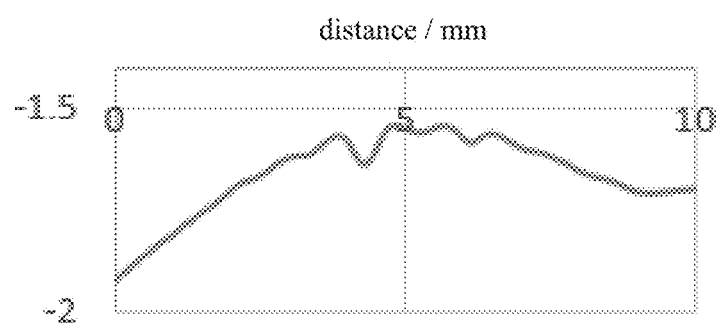
FIG. 18 is a curved diagram showing a warping degree of a first experimental group of a display module provided by the embodiment of the present disclosure.

In some embodiments, as shown in FIG. 13, FIG. 16, and FIG. 17, the first unit 311 includes a first surface 410 located on a first side of the first backplate 310 and a second surface 420 located on a second side of the first backplate 310. The second unit 312 includes a third surface 430 located on a first side of the first backplate 310 and a fourth surface 440 located on a second side of the first backplate 310. The first surface 410 is flush with the third surface 430. A minimum distance between the first surface 410 and the second surface 420 is greater than or equal to a maximum distance between the third surface 430 and the fourth surface 440. The second surface 420 is an arc surface.

The thickness of the first unit 311 is greater than the thickness of the second unit 312, and a surface of the first unit 311 protruding from the second unit 312 is an arc surface, which can improve an adhesive force between the supporting component 300 and adjacent layers. Furthermore. As such, an occurrence possibility of warping and warping amplitude are reduced, effects of warping on a normal display are weakened, and a display effect of the display module 100 is improved.

In some embodiments, as shown in FIG. 13, the second surface 420 is located on a side of the first surface 410 away from the display function part 210, and the second surface 420 is an arc surface concave toward the first unit 311.

An arc direction of the second surface 420 corresponds to a bending direction of the bending part 220 and also corresponds to a bending direction of the curved display area 103, which can better release stress and increase a stress threshold value of warping occurrence. As such, an occurrence possibility of warping and warping amplitude are reduced, effects of warping on a normal display are weakened, and a display effect of the display module 100 is improved.

In some embodiments, as shown in FIG. 16 and FIG. 17, the second surface 420 is located on a side of the first surface 410 close to the display function part 210, and the second surface 420 is an arc surface convex toward the display function part 210.

In some embodiments, as shown in FIG. 17, the second surface 420 is located on a side of the first surface 410 close to the display function part 210, and the second surface 420 is an arc surface convex toward the display function part 210. In at least one of the corner areas 104, along a direction away from the flat display area 102, a growth rate of the thickness of the first unit 311 is first increased and then is decreased.

When the second surface 420 is closer to the display function part 210, the growth rate of the thickness of the first unit 311 needs to be smoother. This is more conducive to release stress during bending. Therefore, stress threshold value of warping occurrence is reduced. As such, an occurrence possibility of warping and warping amplitude are reduced, effects of warping on a normal display are weakened, and a display effect of the display module 100 is improved.

In some embodiments, the first backplate 310 further includes a second unit 312 located in the edge area 105, the first unit 311 is connected to the second unit 312, and an elastic modulus of the first unit is less than an elastic modulus of the second unit 312.

The second unit 312 and the first unit 311 may have different elastic moduli by having different material or being stretched to different degrees during manufacturing processes. The elastic modulus of the first unit 311 is less, which is more conducive to be attached and bent. Therefore, an occurrence possibility of warping and warping amplitude are reduced, effects of warping on a normal display are weakened, and a display effect of the display module 100 is improved.

Figure 14:
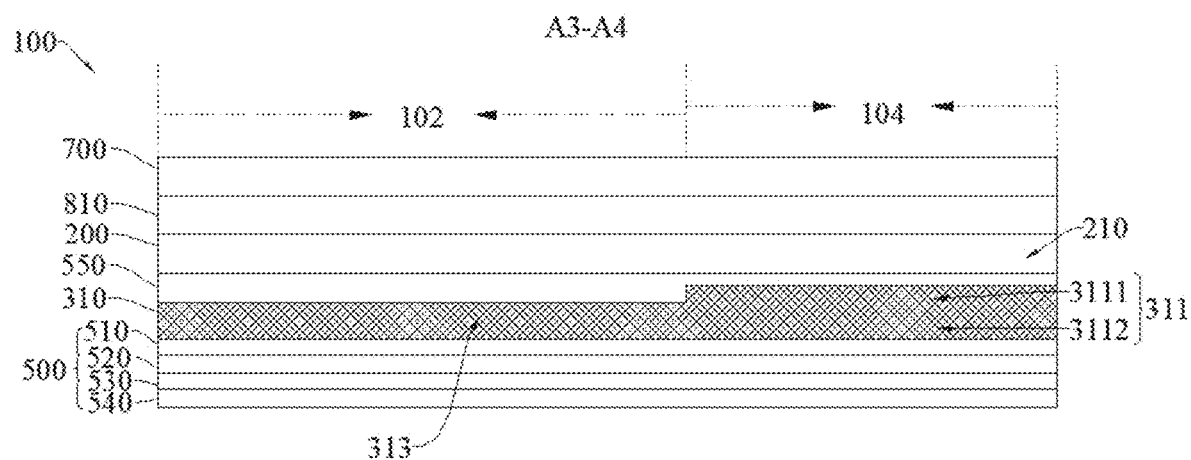
FIG. 14 is a fifth structural schematic view taken along cross-section A3-A4 in FIG. 3.
Figure 15:
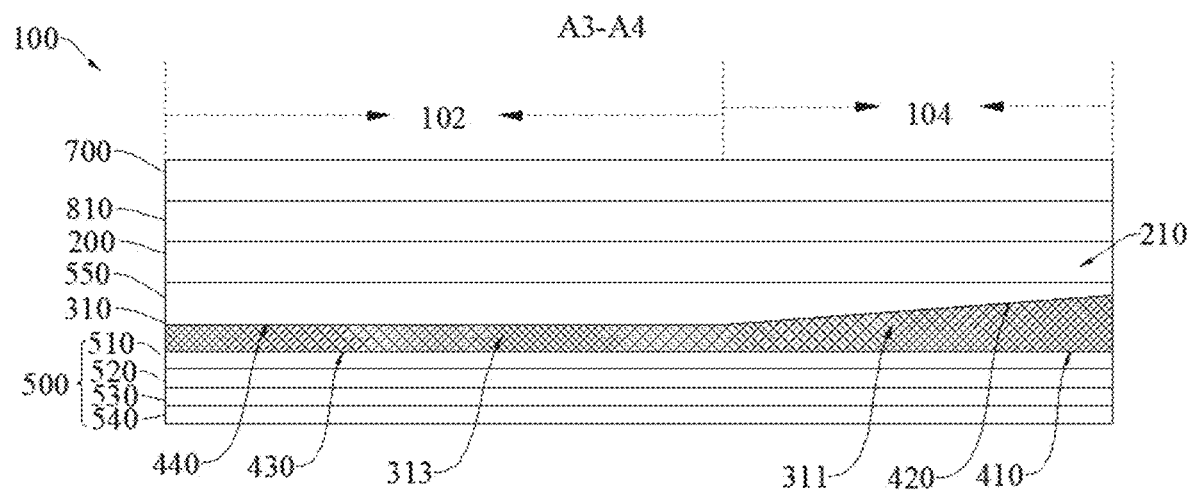
FIG. 15 is a sixth structural schematic view taken along cross-section A3-A4 in FIG. 3.

In some embodiments, as shown in FIG. 14, the first unit 311 includes a first part 3111 and a second part 3112. The first part 3111 is located on a side of the second part 3112 close to the display function part 210. An elastic modulus of the first part 3111 is less than an elastic modulus of the second portion 3112.

The elastic modulus of the first unit 311 on the side closer to the display function part 210 is smaller, which is more conducive to attaching and bending. As such, an occurrence possibility of warping and warping amplitude are reduced, effects of warping on a normal display are weakened, and a display effect of the display module 100 is improved.

In some embodiments, the elastic modulus of the first unit 311 ranges from 2500 MPa to 3000 MPa, and the elastic modulus of the second unit 312 ranges from 3300 MPa to 3700 MPa.

In some embodiments, material of the supporting component 300 may be polyethylene terephthalate or polyimide, and is not limited here.

Figure 10:
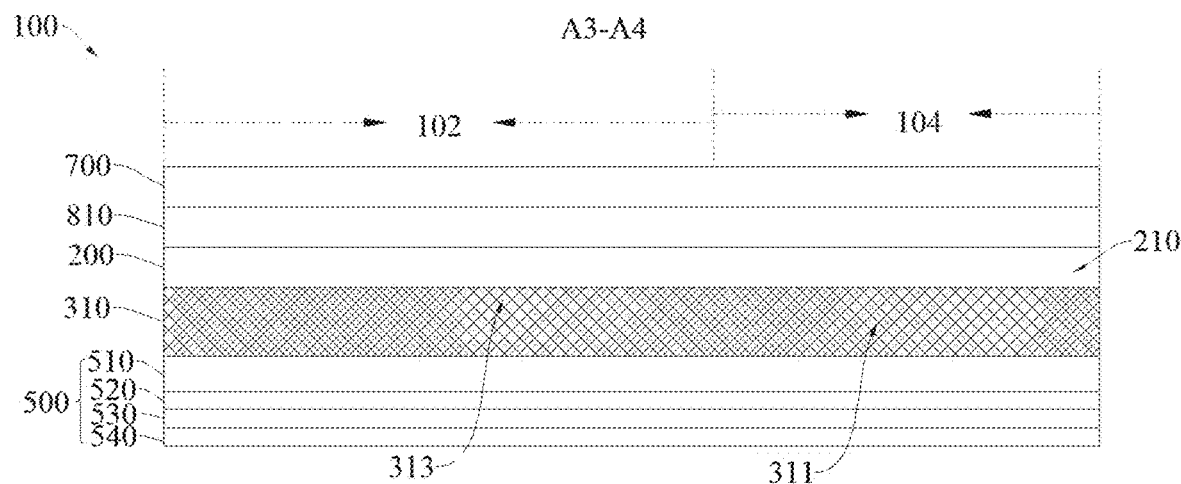
FIG. 10 is a first structural schematic view taken along cross-section A3-A4 in FIG. 3.
Figure 11:
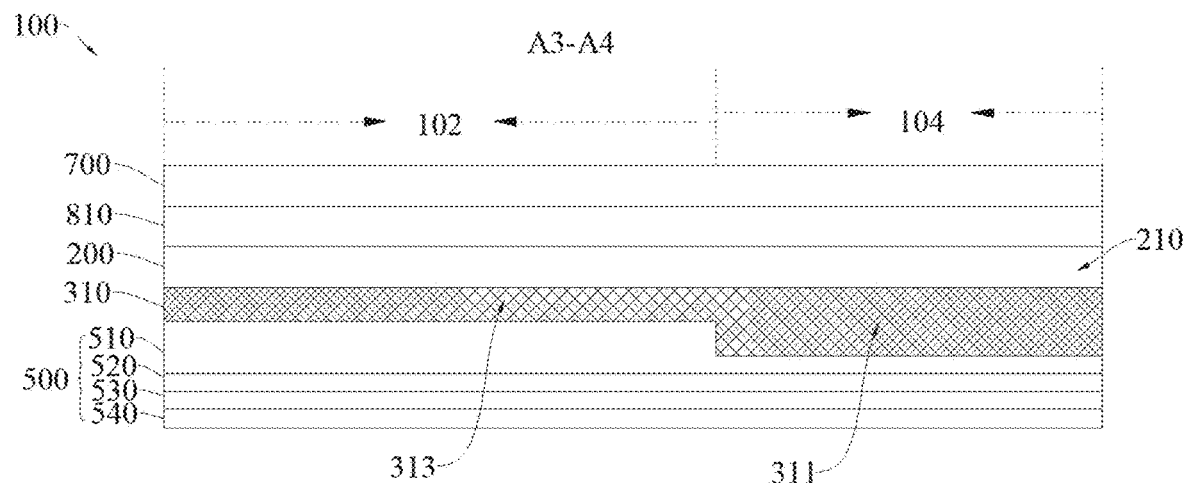
FIG. 11 is a second structural schematic view taken along cross-section A3-A4 in FIG. 3.
Figure 12:
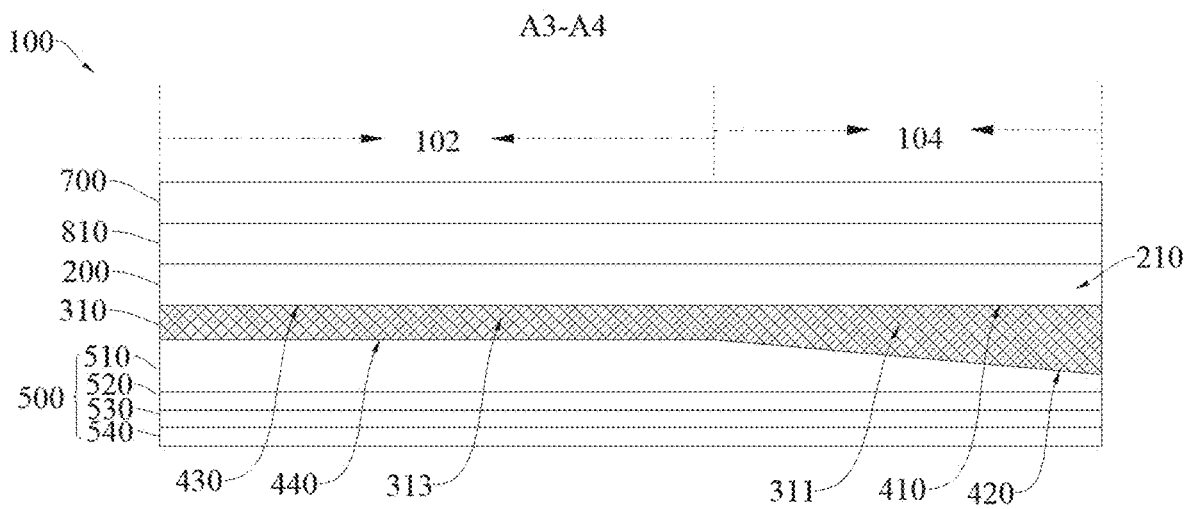
FIG. 12 is a third structural schematic view taken along cross-section A3-A4 in FIG. 3.

In some embodiments, as shown in FIG. 3 and FIG. 10, the first backplate 310 further includes a third unit 313 located in the flat display area 102. The third unit 313 is connected to the first unit 311 and the second unit 312. A thickness of the first unit 311 is equal to a thickness of the third unit 313.

The thickness of the third unit 313 located in the flat display area 102 is equal to the thickness of the first unit 311 located in the corner areas 104 and the thickness of the second unit 312 located in the edge area 105. The first backplate 310 having an even thickness is relatively easy to be manufactured. It is not necessary to provide other layers to compensate a gap. Therefore, cost is reduced, and thickness uniformity of the entire display module 100 is improved.

In some embodiments, as shown in FIG. 3, FIG. 8, FIG. 9, FIG. 11, FIG. 12, and FIG. 17, the first backplate 310 further includes the third unit 313 located in the flat display area 102. The third unit 313 is connected to the first unit 311 and the second unit 312. A thickness of the third unit 313 is less than the thickness of the second unit 312, and the thickness of the third unit 313 is greater than the thickness of the second backplate 320.

The second backplate 320 can be thinned to accommodate stress due to bending. Furthermore, under a condition that a thickness of other layers, the polarizer layer 810 and an insulating layer of the display panel 100, remains unchanged, a bending radius of the bending part 220 remains unchanged. Therefore, a radian of the bending part 220 remains unchanged, so that the stress applied to other layers remains unchanged. and cost of adjusting stress applied to other layers is reduced. When the thickness of the second backplate 320 is equal to the thickness of the third unit 313, entire manufacturing process of the supporting member 300 is simple, manufacturing efficiency is improved.

In some embodiments, the thickness of the second backplate 320 ranges 30 μm to 90 μm.

In some embodiments, as shown in FIG. 3 and FIG. 10, the thickness of the third unit 313 is equal to the thickness of the first unit 311. Layers in the edge area 105 and layers in the corner area 104 have a same thickness, which is conducive to uniform bending and uniform stress release. As such, an occurrence possibility of warping and warping amplitude are further reduced, effects of warping on a normal display are weakened, and a display effect of the display module 100 is improved.

In some embodiments, the thickness of the first unit 311 is less than or equal to 250 μm. The thickness of the first unit 311 should not be too great. If the thickness is too great, a radian of the bending part 220 will be too great, which increases a thickness of the display module 100. Furthermore, when an overly thick cover plate 700 is attached to the cover plate 700, attachment stress will also be too great. Therefore, layers involved in attachment processes are easy to be peeled off, which is not conducive to attachment and affects a normal display.

In some embodiments, the thickness of the first unit 311 is greater than or equal to 90 μm, and the thickness of the first unit 311 is less than or equal to 150 μm.

Results of the third experimental group are as shown in a following table 2.

TABLE 2

| Experimental group | Maximum warping amplitude/mm | Maximum warping wavelength/mm |
|---|---|---|
| 3 | 0.052 | 0.752 |

Figure 19:
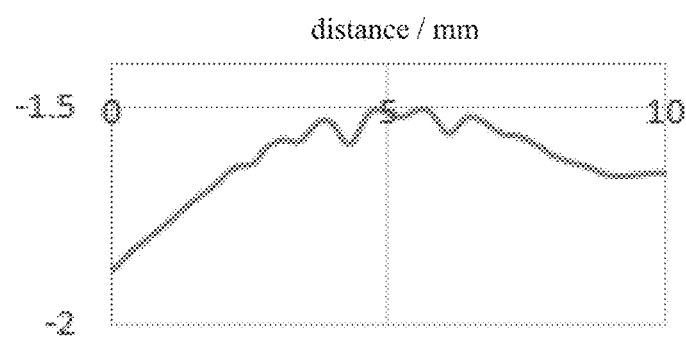
FIG. 19 is a curved diagram showing a warping degree of a second experimental group of a display module provided by the embodiment of the present disclosure.
Figure 20:
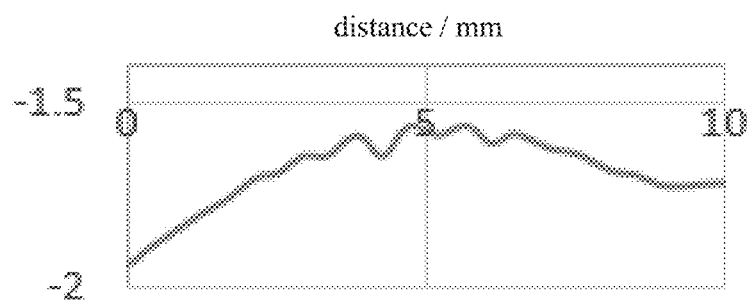
FIG. 20 is a curved diagram showing a warping degree of a third experimental group of a display module provided by the embodiment of the present disclosure.
Figure 21:
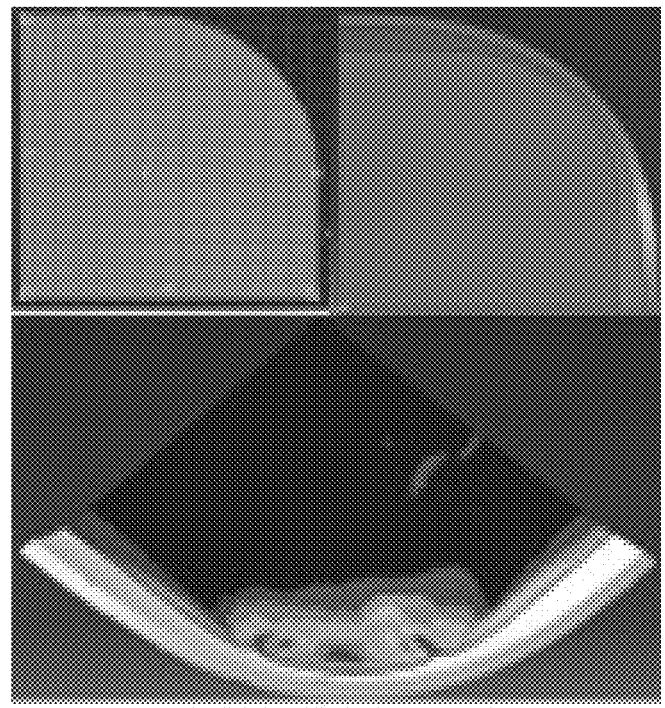
FIG. 21 is a simulation diagram showing generation of warping in the first experimental group of the display module provided by the embodiment of the present disclosure.
Figure 22:
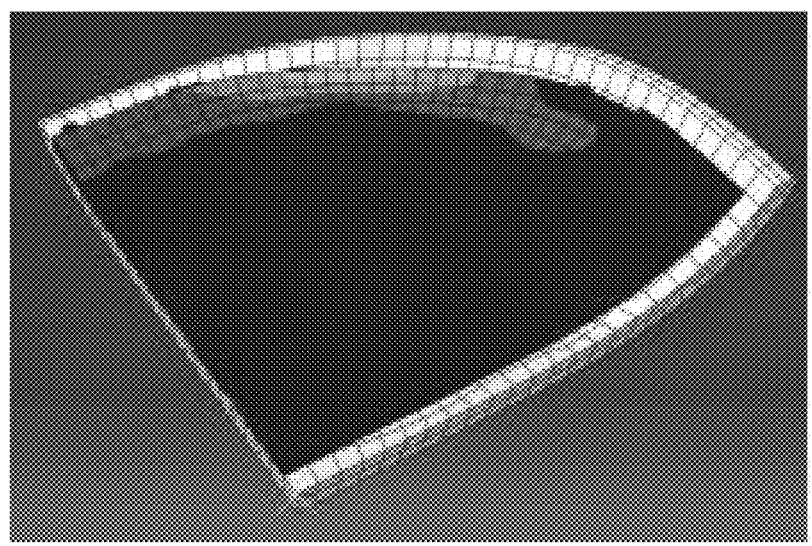
FIG. 22 is a simulation diagram showing generation of warping in the second experimental group of the display module provided by the embodiment of the present disclosure.

Please refer to FIG. 19 and FIG. 20. When the thickness of the first backplate 310 is changed from 90 μm to 150 μm, the maximum warping amplitude is decreased by 18.8%. Compared with an increased thickness, a reduction ratio of the maximum warping wavelength is 0.00020 mm/μm, and a shortening ratio of the maximum warping wavelength is 10.16%. Compared with the first backplate 310 having a thickness changed from 60 μm to 90 μm, the maximum warping amplitude is decreased more. However, the reduction rate of the maximum warping wavelength is reduced. Therefore, a contribution rate of an increase of the thickness of the first backplate 310 per unit to reducing warping is gradually decreased. Furthermore, a warping density per attachment area is also increased. Thus, the thickness of the backplate 310 is further increased, which is not conducive to attachment and reducing warping. Therefore, the thickness of the first unit 311 is set to be less than or equal to 150 μm, which can not only reduce an occurrence possibility of warping, but also balance a thickness and attachment flatness. Therefore, a thickness of layers is optimized.

In some embodiments, as shown in FIG. 3, FIG. 7, FIG. 8, and FIG. 9, the display panel 200 further includes a heat-dissipation function layer 500 disposed on a side of the first backplate 310 away from the display panel 200 and a connecting part 600 disposed on a side of the second backplate 320 close to the heat-dissipation function layer 500.

The display module 100 includes four curved surfaces and four curved angles. For ease of drawing and understanding, the cover plate 700 and the heat-dissipation function layer 500 are all drawn as a plan view. The cover plate 700 is a curved cover plate 700 which corresponds to the curved display area 103 and the flat display area 102 of the display panel 200. The heat-dissipation function layer 500 includes a first adhesive layer 510, a foam layer 520 disposed on the side of the first adhesive layer 510 away from the first backplate 310, a polyimide layer 530 disposed on a side of the foam layer 520 away from the adhesive layer 510, and a metal layer 540 disposed on a side of the polyimide layer 530 away from the first adhesive layer 510. The metal layer 540 may be a copper layer.

In some embodiments, as shown in FIG. 3, FIG. 7, and FIG. 17, the display module 100 further includes a second adhesive layer 550 disposed on a side of the first backplate 310 close to the display panel 200.

Figure 8:
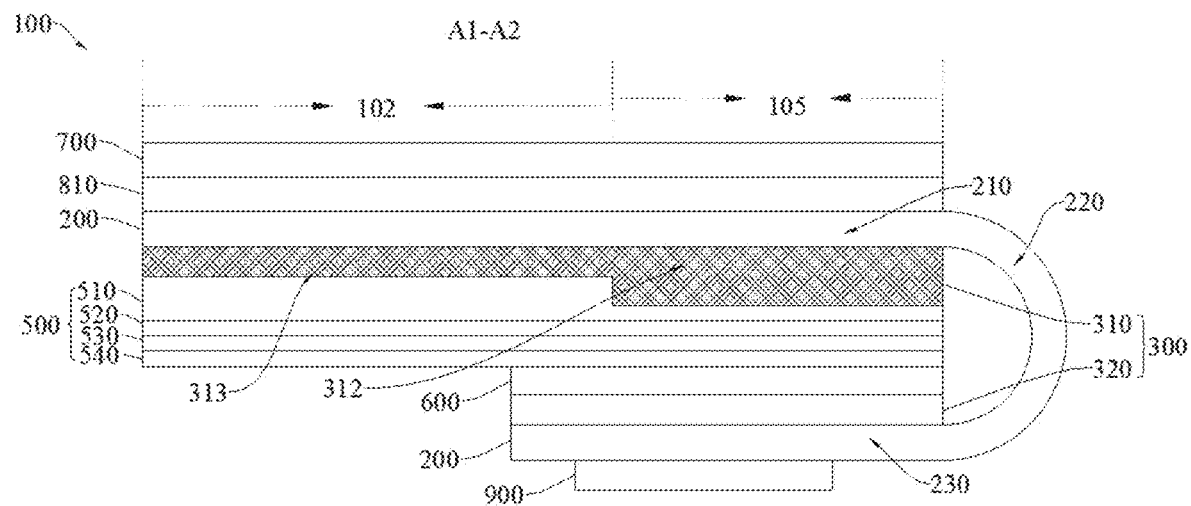
FIG. 8 is a second structural schematic view taken along cross-section A1-A2 in FIG. 3.
Figure 9:
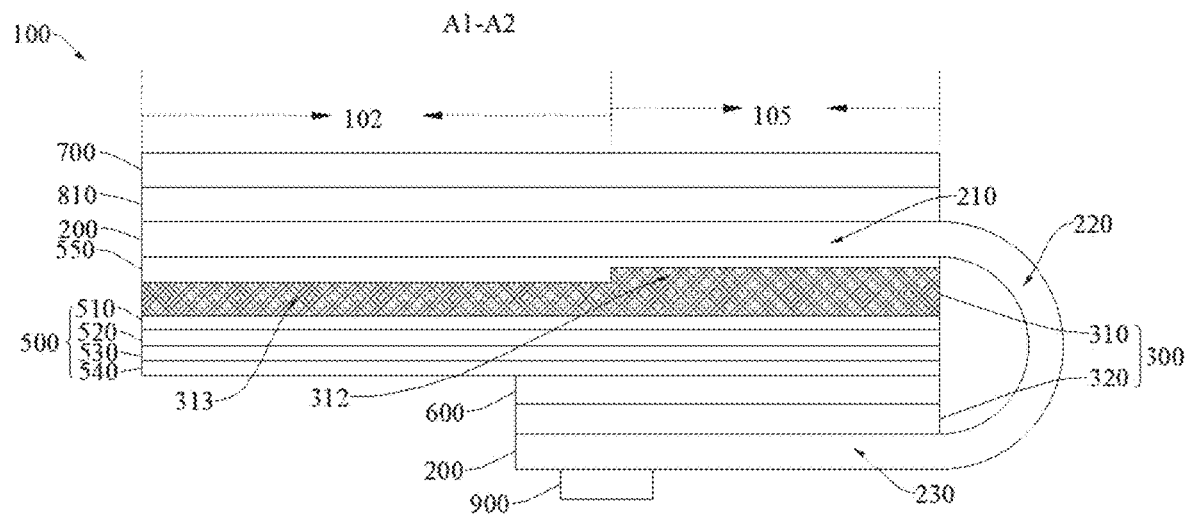
FIG. 9 is a third structural schematic view taken along cross-section A1-A2 in FIG. 3.

In some embodiments, as shown in FIG. 8 and FIG. 9, when the thickness of the third unit 313 and the thickness of the second unit 312 are different, a gap may be compensated by the first adhesive layer 510 or/and the second adhesive layer 550, thereby improving flatness of layers of the display module 100.

In some embodiments, as shown in FIG. 3 and FIGS. 7 to 9, the display module 100 further includes a driving unit 900 electrically connected to the bonding part 230.

In some embodiments, when the supporting component 300 is formed, a segmented release film can be used during attachment processes. The release film corresponds to the structure of the supporting component 300 of any one of the above embodiments which are not described here again.

In some embodiment, the display panel 200 includes an array substrate and a luminescent device layer.

In some embodiments, the array substrate includes an active layer disposed on a substrate, a first insulating layer disposed on the active layer, a gate layer disposed on the first insulating layer, a second insulating layer disposed on the gate layer, a source/drain electrode layer disposed on the second insulating layer, and a third insulating layer disposed on the source/drain electrode layer.

In some embodiments, the luminescent device layer includes an anode layer disposed on the third insulating layer, a luminescent material layer disposed on the anode layer, and a cathode layer disposed on the luminescent material layer. The display panel 200 further includes a pixel-defining layer disposed on a same layer as the luminescent material layer, a polarizer layer 810 disposed on the luminescent device layer, and a flexible cover plate 700 disposed on the polarizer layer 810. The display panel 200 further includes a plurality of corresponding adhesive layers disposed between the polarizer layer 810 and the flexible cover plate 700, disposed between the luminescent device layer and the polarizer layer 810, or disposed between the backplate and the substrate.

When display panels are attached to a polarizer layer and a cover plate, main layers to counteract generation of warping due to the attachment are a supporting component and the polarizer layer. A thickness of the supporting component is easy to be controlled. In the present disclosure, a thickness of the supporting component in corner areas is increased, thereby increasing a stress threshold value of warping generation. Therefore, a possibility of generation of warps is effectively reduced. Undulation of warping is reduced. As such, effects of warping on a normal display function of the corner areas are reduced, and a display effect of a display module is improved.

Figure 23:
FIG. 23 is a structural schematic view showing a display device provided by an embodiment of the present disclosure.

Please refer to FIG. 23, an embodiment of the present disclosure further provides a display device 10, including any one of the above display modules 100 and a main body device 20. The main body device 20 and the display module 100 are integrated.

A specific structure of the display module 100 and a specific structure of the display backplate can be referred to any one of the embodiments and the drawings of the display module 100 and the display backplate which are not described here again.

In the present embodiment, the main body device 20 may include a middle frame and a frame sealant. The display device 10 may be a display terminal such as a cell phone, a watch, a tablet, or a television, and is not limited here.

Embodiments of the present disclosure provide a display module and a display device. The display module includes a display area. The display area includes a flat display area and a curved display area. The curved display area includes a corner area and an edge area. The display module includes a display panel and a supporting component. The display panel includes a display function part, a bonding part, and a bending part which are disposed in the display area. The supporting component includes a first backplate and a second backplate opposite to each other. The first backplate is disposed on a side of the display function part close to the bonding part. The second backplate is disposed on a side of the bonding part close to the display function part. The first backplate includes a first unit disposed in the corner area. A thickness of the first unit is greater than a thickness of the second backplate. In the present embodiment, a thickness of the supporting component disposed in the corner area is increased to increase a stress threshold value of warping generation. As such, an occurrence possibility of warping and warping amplitude are reduced, effects of warping on a normal display are weakened, and a display effect of the display module is improved.

It should be understood that many changes and modifications to the described embodiment can be carried out by those skilled in the art, and all such changes and modifications are intended to be included within the scope of the appended claims.

What is claimed is:

1. A display module, comprising a display area, wherein the display area comprises a flat display area and a curved display area surrounding the flat display area, the curved display area comprises four corner areas and an edge area defined between two adjacent corner areas, and the display module comprises:
   a display panel, wherein the display panel comprises a display function part disposed in the display area, a bonding part opposite to the display function part, and a bending part connecting the display function part with the bonding part; and
   a supporting component, wherein the supporting component is disposed on a side of the display panel, the supporting component comprises a first backplate and a second backplate opposite to each other, the first backplate is disposed on a side of the display panel close to the bonding part, and the second backplate is disposed on a side of the bonding part close to the display function part;
   wherein the first backplate comprises a first unit disposed in the corner areas, in at least one of the corner areas, a thickness of the first unit is increasingly increased along a direction away from the flat display area, and a minimum thickness of the first unit is greater than a thickness of the second backplate.

2. The display module of claim 1, wherein the thickness of the first unit is greater than or equal to 90 μm.

3. The display module of claim 2, wherein the first backplate comprises a second unit disposed in the edge area, the first unit is connected to the second unit, and a thickness of the second unit is equal to the thickness of the first unit.

4. The display module of claim 3, wherein the first backplate comprises a third unit disposed in the edge area, the third unit is connected to the first unit and the second unit; and
   wherein a thickness of the third unit is equal to the thickness of the first unit.

5. A display module, comprising a display area, wherein the display area comprises a flat display area and a curved display area surrounding the flat display area, the curved display area comprises four corner areas and an edge area defined between two adjacent corner areas, and the display module comprises:
   a display panel, wherein the display panel comprises a display function part disposed in the display area, a bonding part opposite to the display function part, and a bending part connecting the display function part with the bonding part; and
   a supporting component, wherein the supporting component is disposed on a side of the display panel, the supporting component comprises a first backplate and a second backplate opposite to each other, the first backplate is disposed on a side of the display panel close to the bonding part, and the second backplate is disposed on a side of the bonding part close to the display function part;
   wherein the first backplate comprises a first unit disposed in the corner areas, and a thickness of the first unit is greater than a thickness of the second backplate;
   wherein the thickness of the first unit is greater than or equal to 90 μm;
   wherein the first backplate comprises a second unit disposed in the edge area, the first unit is connected to the second unit, the thickness of the first unit is greater than a thickness of the second unit, and the thickness of the second unit is greater than thickness of the second backplate.

6. The display module of claim 5, wherein the first backplate comprises a third unit disposed in the flat display area, the third unit is connected to the first unit and the second unit; and
   wherein a thickness of the third unit is less than a thickness of the second unit, and the thickness of the third unit is greater than the thickness of the second backplate.

7. The display module of claim 5, wherein at least one of the corner areas, the thickness of the first unit is increasingly increased along a direction away from the flat display area, and a minimum thickness of the first unit is greater than the thickness of the second backplate.

8. The display module of claim 7, wherein the first unit comprises a first surface defined on a first side of the first backplate and a second surface defined on a second side of the first backplate, and the second unit comprises a third surface defined on the first side of the first backplate and a fourth surface defined on the second side of the second backplate; and
   wherein the first surface is flush with the third surface, a minimum distance between the first surface and the second surface is greater than or equal to a maximum distance between the third surface and the fourth surface, and the second surface is an arc surface.

9. The display module of claim 2, wherein the first backplate comprises a second unit disposed in the edge area, the first unit is connected to the second unit, and an elastic modulus of the first unit is less than an elastic modulus of the second unit.

10. The display module of claim 2, wherein the thickness of the first unit is less than or equal to 250 μm.

11. The display module of claim 10, wherein the thickness of the first unit is less than or equal to 150 μm.

12. A display device, comprising a display module and a main body device, wherein the main body device and the display module are integrated;
   wherein the display area comprises a flat display area and a curved display area surrounding the flat display area, the curved display area comprises four corner areas and an edge area defined between two adjacent corner areas, and the display module comprises:

a display panel, wherein the display panel comprises a display function part disposed in the display area, a bonding part opposite to the display function part, and a bending part connecting the display function part with the bonding part; and a supporting component, wherein the supporting component is disposed on a side of the display panel, the supporting component comprises a first backplate and a second backplate opposite to each other, the first backplate is disposed on a side of the display panel close to the bonding part, and the second backplate is disposed on a side of the bonding part close to the display function part;

wherein the first backplate comprises a first unit disposed in the corner areas, in at least one of the corner areas, a thickness of the first unit is increasingly increased along a direction away from the flat display area, and a minimum thickness of the first unit is greater than a thickness of the second backplate.

13. The display device of claim 12, wherein the thickness of the first unit is greater than or equal to 90 μm.

14. The display device of claim 13, wherein the first backplate comprises a second unit disposed in the edge area, the first unit is connected to the second unit, and a thickness of the second unit is equal to the thickness of the first unit.

15. The display device of claim 13, wherein the first backplate comprises a third unit disposed in the flat display area, the third unit is connected to the first unit and the second unit; and wherein a thickness of the third unit is less than the thickness of the second unit, and the thickness of the third unit is greater than the thickness of the second backplate.

16. The display device of claim 13, wherein the first backplate comprises a second unit disposed in the edge area, the first unit is connected to the second unit, the thickness of the first unit is greater than a thickness of the second unit, and the thickness of the second unit is greater than thickness of the second backplate.

17. The display device of claim 16, wherein in at least one of the corner areas, the thickness of the first unit is increasingly increased along a direction away from the flat display area, and a minimum thickness of the first unit is greater than the thickness of the second backplate.

18. The display device of claim 13, wherein the first backplate comprises a second unit disposed in the edge area, the first unit is connected to the second unit, and an elastic modulus of the first unit is less than an elastic modulus of the second unit.

19. The display device of claim 13, wherein the thickness of the first unit is less than or equal to 250 μm.

20. The display device of claim 19, wherein the thickness of the first unit is less than or equal to 150 μm.

* * * * *